Dec. 29, 1942.      F. G. WAHL      2,306,475
POWER TRANSMITTING MECHANISM
Filed July 17, 1941      2 Sheets-Sheet 1
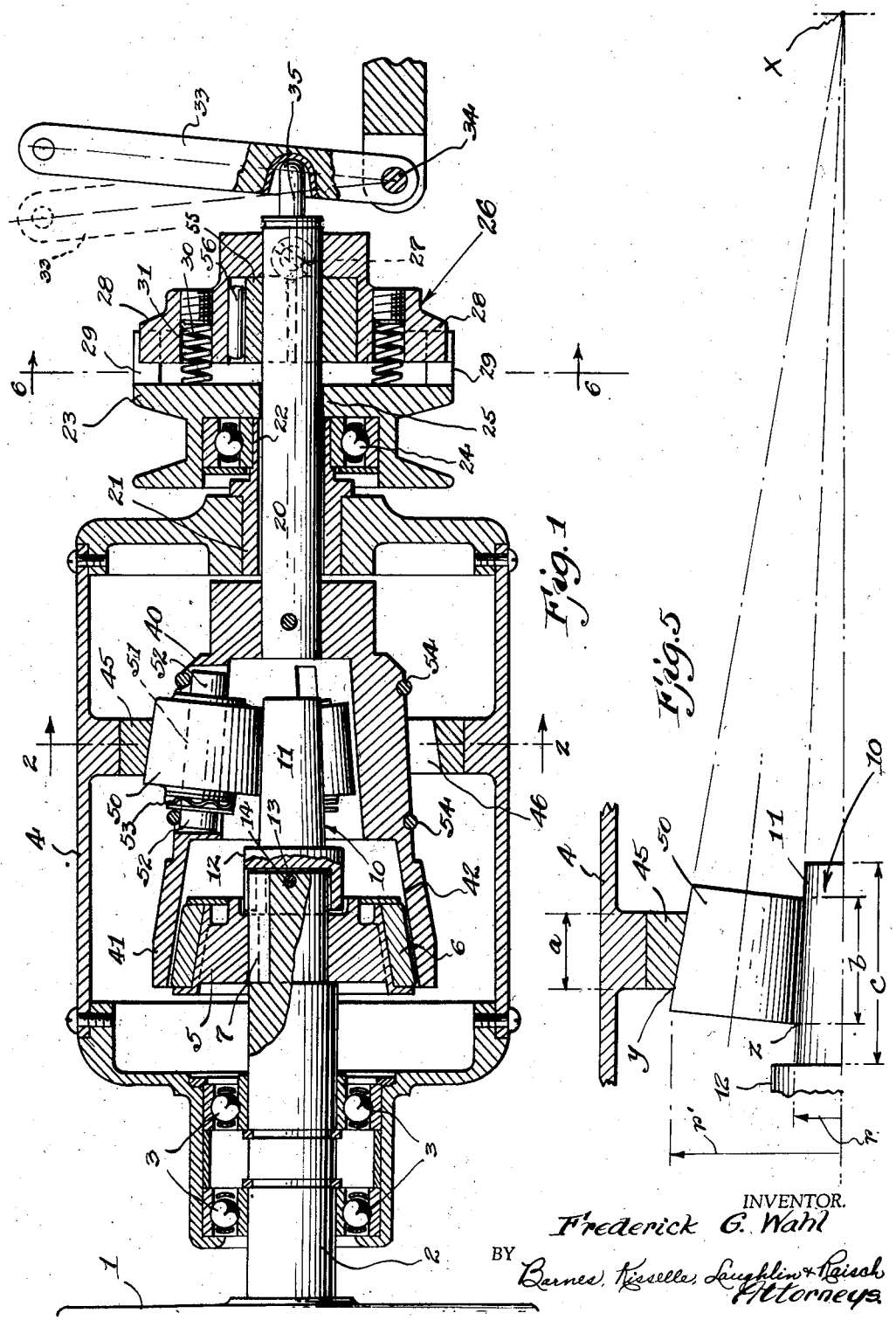
INVENTOR.
Frederick G. Wahl
BY Barnes, Kisselle, Laughlin & Raisch
Attorneys Dec. 29, 1942. F. G. WAHL 2,306,475
POWER TRANSMITTING MECHANISM
Filed July 17, 1941 2 Sheets-Sheet 2
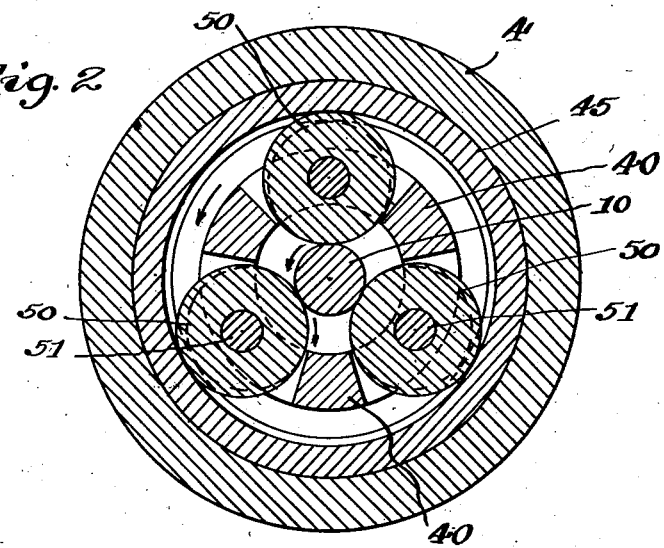
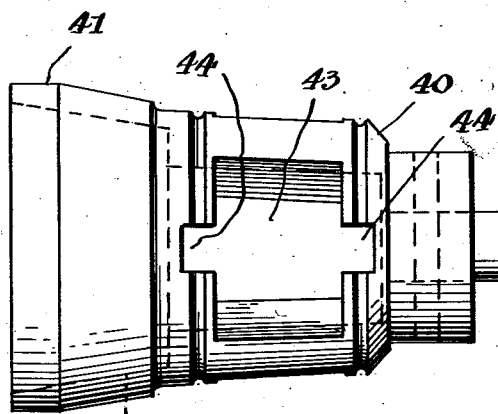
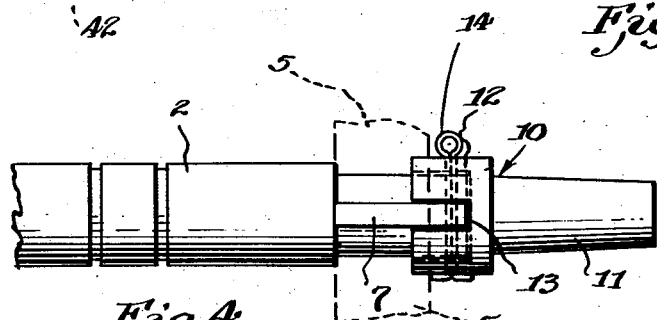
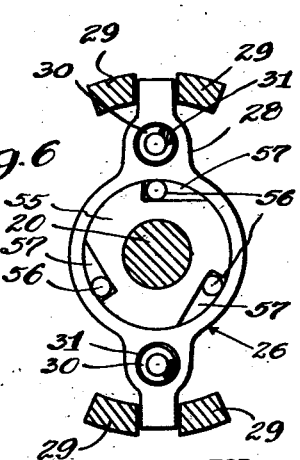
INVENTOR
Frederick G. Wahl
BY Barnes, Kisselle, Laughlin & Reich
Attorneys.

Patented Dec. 29, 1942

2,306,475

UNITED STATES PATENT OFFICE 2,306,475

POWER TRANSMITTING MECHANISM

Fred G. Wahl, Detroit, Mich.

Application July 17, 1941, Serial No. 402,742

4 Claims. (Cl. 74—281)

This invention relates to a mechanism for transmitting torque, and particularly to such a mechanism where driving and driven members can be coupled together so that the torque and speed ratios are other than 1 to 1.

An apparatus of this nature is disclosed and claimed in my co-pending application Serial No. 350,033, filed August 2, 1940, now Patent No. 2,255,200 of September 9, 1941.

In accordance with the invention the coupled relationship of the driving and driven members when the ratio is other than 1 to 1 is established by rolling elements and race-ways therefor with the rolling elements and the raceways having smooth surfaces and disposed in planetary relation. Among the objects of the present invention is to provide a construction wherein the engagement between the rolling elements and the raceways will afford adequate contact for transmission of torque irrespective of variations within the small tolerances that are unavoidably encountered in the machining and manufacturing of the mechanism. Also, the objects include the provision and arrangement wherein the rolling elements are in the form of tapered rollers and which are in true planetary relationship with the raceways upon which they function throughout the axial extent of the contact therewith. Other objects will become more apparent as the detailed description follows in conjunction with the accompanying drawings, and these include an arrangement where the ratio may be changed quickly and silently without having the load of the driven mechanism causing a shock upon the torque transmitting mechanism.

Fig. 1 is a longitudinal cross sectional view taken through a mechanism constructed in accordance with the invention.

Fig. 2 is a cross sectional view taken substantially on line 2—2 of Fig. 1 showing the rollers and raceways.

Fig. 3 is a view illustrating the carriage construction for the rolling elements.

Fig. 4 is a detailed view showing the floating mounting of one of the raceways.

Fig. 5 is a view largely diagrammatic illustrating the angle arrangement of the roller and raceway surface.

Fig. 6 is a cross sectional view substantially on line 6—6 of Fig. 1 showing an overrunning drive coupling.

In the drawings a suitable source of power is illustrated as being in the form of an electric motor 1 connected to operate a shaft 2 which may be called the driving shaft. The shaft may be journaled in bearings 3 and the support therefor and the support for other operating elements may be in the form of a housing 4. A friction clutch is advantageously employed in the construction, and to this end an inner member 5 of a cone clutch having a friction facing 6 is keyed to the shaft 2 as at 7.

A tapered race member 10 having an externally tapered surface 11 is connected to be driven by the member 2, and the connection is such that the member 10 is floatingly mounted. To this end, the member 10 which, of course, is also a driving member, has an enlarged head 12 with a socket loosely receiving the end of the shaft 2. The key 7, as shown in Fig. 4, projects from the clutch member 5 toward the end of the shaft 2, and the head 12 is slotted as at 13 so as to loosely receive the key. A pin 14 extends through the head 12 and the shaft 2 at right angles to the key 7 and the pin is likewise loose in the apertures therefor. The pin is used largely for assembly purposes. Accordingly, it will be noted that the member 10 is coupled to the shaft 2 so that it is operated thereby, but so that the member 10 is floating in that it has a limited amount of universal movement relative to the shaft 2.

A driven shaft 20 extends through a bushing 21 in the end of the housing and the shaft 20 is loose in the bushing so that the bushing does not constitute a bearing therefor. The bushing has an extending end 22 upon which a pulley 23 is mounted preferably through the means of an antifriction bearing 24. The pulley has an axial aperture freely fitting the shaft 20 as at 25. The pulley and shaft are coupled together for rotation in unison, and therefore while there is no relative rotation at 25 the shaft 20 takes its bearing through the pulley and on to the antifriction bearing 24.

A cross head 26 is secured in driving relationship with the driven shaft 20 as by means of a set screw or the like as shown at 27, and the cross head has extending arms 28 disposed in slots of extensions 29 in the pulley. Thus the shaft and pulley are coupled together but capable of relative axial movement. Springs 30 are positioned in recesses 31 of the cross head, and act to shift the shaft 20 to the right as Fig. 1 is viewed, and it reacts against the pulley and its bearing 24. The shaft 20 may be shifted by suitable control means axially and relative to the pulley for operating purposes as will presently appear, and one means for accomplishing this resides in an operating lever 33 suitably fulcrumed as at 34 and having a recess for engaging a pin 35 positioned in and projecting from the end of the shaft 20. When the lever 33 is shifted counter-clockwise as illustrated by the dotted lines in Fig. 1, the shaft 29 is shifted to the left against the action of the springs 30.

The driven shaft 20 includes a carriage 40 which may be integral therewith or securely fastened thereto in any approved manner. This carriage is of hollow formation and its free end 41 constitutes the outer member of the cone clutch, the same having a coned or tapered internal surface 42 for engaging the friction material 6. This carriage, as shown in Fig. 3, is provided with a number of circumferentially spaced apertures 43 having ensmalled ends 44. The apertures are located so as to surround the race member 10, and outwardly from this portion of the carriage is a race member 45 having a tapered internal raceway surface 46.

The carriage rotatably supports a set of tapered rollers; the number of rollers in the set may, of course, vary as desired, but, as shown in Fig. 2, there are three of such rollers, as indicated at 50. These tapered rollers are each journaled on axle members 51 having squared or flattened ends 52 which are received in the end portions 44 so that the axles can shift radially inwardly and outwardly. Each roller is preferably urged yieldingly axially in the direction of its smaller end and this is advantageously accomplished by a wavy spring washer 53 disposed around each axle adjacent the large end of the accompanying roller and reacting against the end wall of the opening 43. In order to hold the axles in position in the carriage and to also hold them in position against centrifugal force, split spring rings 54 may be placed around the carriage in positions to overlie the projecting ends 52 of the roller axles. In some instances, however, both the springs 54 and the springs 53 may be dispensed with.

In some installations it is preferable to provide a uni-directional coupling between the driven shaft 20 and the pulley, and this may be carried out as shown in Fig. 6. The cross head 28 includes a hub portion 55 rotatably fitting within the same and which is notched, and rollers or balls 56 are disposed in the notches. When the shaft, as Fig. 6 is viewed, is rotating counter-clockwise, the roller elements become wedged between the notch surface and the inner surface 57 of the member 28 which surrounds the hub. A rather conventional form of overrunning type of clutch is shown, and this permits the member 28 and the pulley and driven mechanism to overrun the shaft 20. The reason for this is as follows: when the mechanism is quickly operated to disengage the friction clutch and to establish the connection across the tapered rollers, at which time the shaft 20 rotates considerably slower than the driving shaft 2, the mechanism driven by the pulley is not suddenly reduced in speed and therefore there is no sudden shock transmitted to the mechanism by an attempted quick reduction of speed of the driven mechanism which may have considerable momentum. The pulley and cross head 28 merely overrun the shaft until they gradually come down to the speed thereof.

The mechanical functioning of the apparatus just described is as follows: the normal condition is that the springs 30 urge the driven member 20 and its carriage axially to the right as Fig. 1 is viewed, thus disengaging the friction clutch as indicated. In other words, this withdraws the internal surface 42 from engagement with the friction material 6. This also draws the rollers 50 to the right and causes their tapered surfaces to engage with pressure, the external tapered surfaces of the driving member 10 and the internal tapered surface of the race 45 which is held fixed against rotation. Accordingly, a coupling between the driving member 2 and the driven member 20 is established which is in the nature of a planetary connection.

Considering Fig. 2, it will be noted that if the driving member 10 rotates counter-clockwise as indicated by the arrow, that the rollers are caused to rotate clockwise. The rollers in turn roll or function upon the internal surface of the member 45 and since the member 45 is fixed the carriage and the driven member are caused to rotate counter-clockwise in the direction of rotation of the driving member 10. At this time the speed ratio between the driving and driven members is other than 1 to 1 and with the mechanism shown the driven member is operated at a lower speed than that of the driving member. The ratio, of course, is variable and depends upon the sizes of the raceways and the rollers, but it might be said that with an apparatus made substantially in accordance with and in the size of the Fig. 1, the speed ratio between the driving and driven members is about 1 to 5½. Suitable control means, either manual or automatic, can be used to shift the lever 33 to the dotted line position. When this is done the driven member and the carriage are shifted to the left and the contact between the rollers and the tapered raceway surfaces is dis-established and the surface 42 engages the friction material 6, with the result that the friction clutch is engaged and the driving ratio is now 1 to 1. This will be maintained until the lever 33 is released, at which time the connection across the planetary rollers is again established. An intermediate position can be maintained where there is no driving connection either at the clutch or at the rollers.

In order that a determinable ratio may be had across the rollers and raceways, and to insure a true rolling action of the tapered rollers on the tapered raceway surfaces so that there is no slippage, the tapered surfaces of the rollers and the raceways are disposed in true planetary relationship. To this end the tapered surfaces of the raceways and the rollers are such that if extended when in contact with each other, as shown in Fig. 5, they meet a common point on the axis of rotation. This point is indicated at X. With this arrangement there is a true rolling action of the rollers on both raceway surfaces throughout the axial extent of the contact. In explanation of this it may be pointed out that in one revolution of a tapered roller the larger end traverses a greater distance than the smaller end and this variation progressively changes from end to end of the tapered roller. If a tapered roller is forced to roll in a straight line on a plane surface, slippage must occur between the roller and the surface; or, on the other hand, if a cylindrical roller is caused to roll in a curved line, there must be slippage between the roller and the surface somewhere in the length of the roller. A similar situation exists where the rollers operate on raceway surfaces rather than on plane surfaces. Any such slippage would not only destroy the ability of the mechanism to provide an ascertainable ratio, but the slippage would result in wear. By arranging the tapered surfaces as above described, any circumferential line around the roller, whether it be at the larger diameter of contact or at the smaller diameter of contact, or any diameter therebetween, has a true planetary relationship and a true rolling action with both raceway surfaces.

Moreover, as exemplified in Fig. 5, it is important and preferred that the axial extent of the outer race be less than the axial extent of the rollers, and that the axial extent of the inner race member be at least equal to and preferably greater than the axial extent of the rollers. This is shown in an exaggerated manner in Fig. 5 where the axial extent $a$ of the outer race is less than the extent $b$ of the roller, while the inner member has a greater axial extent $c$. The object of this is that if there are any variations in the dimensions of the parts which might occur by necessary tolerances in machining and finishing, there will, nevertheless, be a contact between the rollers and the inner race member 10 throughout the axial extent of the contact. For example, suppose the inaccuracy is such as to cause a contact between the roller and the adjacent portion of the outer race at its larger internal diameter substantially at the point Y; this point, being within the axial dimensions of the roller, would cause the roller to swing about a fulcrum substantially at the point Z into a full contact with the surface 11. Accordingly, the driving member operating through a relatively short radius $r$ has the advantage of a complete line contact. The outer fixed race functions through a larger radius $r'$ and therefore can perform its function with a less efficient contact with the roller. Moreover, the fact that the driving member 10 is mounted in a floating manner a good surface to surface contact is obtained with all rollers.

Another feature in the provision of a near perfect contact of the rollers with the raceways lies in the mounting and arrangement of the carriage and driven shaft 20. It will be noted that the carriage itself is floating in that it has no piloting bearing and the shaft 20 has no bearing in the bushing 21. Moreover, there is a slight clearance at 25 between the pulley and the shaft 20. The torque transmitted to the pulley through the cross head may cause the shaft 20 to seat against the surface at 25 slightly eccentric of the true axial center. When the friction clutch is engaged the carriage and shaft 20 are thus piloted by the cone clutch and whatever seating action there is at 25. But this is not the most important function of this mounting, since the mounting is primarily for the function of the rollers. Now obviously, even though the dimensions be very accurately maintained, there are some unavoidable tolerances in the raceway surfaces of the member 10 and the member 45, and in addition to this there may be some variation in the size of the tapered rollers relative to each other. These variations are partially met by the fact that the rollers will cause the inner driving member 10 to take a position as determined by the rollers, and the functioning of the rollers in the rotation of the carriage may, because of dimensional variation, cause the carriage to oscillate. Accordingly, the rollers and carriage are not held by piloted bearings and the rollers are free to seek their own position in contact with the raceways. This oscillation of the carriage causes the driven shaft 20 to shift pivotwise on its engagement at 25 with the pulley. Thus there is no binding action and the rollers and carriage are quite free to oscillate or seek a position for a near perfect contact of the rollers with the raceway surfaces. The bearing 24 performs at least three functions, in that it takes the load of the pulley; it takes the thrust of the springs 30, and takes the radial load of the shaft 20 when torque is transmitted thereby. This lateral load is that load exerted by the shaft when it seats against one side of the aperture in the pulley. The clearance at 25 need not be large as a few thousandths has been found to be adequate.

I claim:

1. In a power transmitting mechanism, a driving member, a driven member, a friction clutch for connecting the same, a member having a universal type connection with the driving member and having an external tapered raceway surface of relatively small diameter, a fixed member having an internal tapered raceway surface, a carriage on the driven member in which a plurality of tapered rollers are journaled, means for shifting the carriage to disengage the contact between the rollers and the raceway surfaces and to engage the friction clutch and for shifting the carriage to disengage the clutch and to urge the rollers into engagement under pressure with the raceway surfaces, to establish respectively a connection through the clutch and through the rollers and the raceway surfaces, the tapered raceway surfaces and the tapered rollers being such that when the surfaces thereof are extended while in contact with each other they meet at the center line of rotation substantially at a common point, a final driven member, a supporting member forming a bearing therefor, the driven member being in the form of a shaft and extending freely through the supporting member, the final driven member having an aperture freely fitting the driven shaft so that the same takes its bearing from the bearing for the final driven member.

2. In a power transmitting mechanism, a driving member, a driven member, a friction clutch for connecting the same, a member having a universal type connection with the driving member and having an external tapered raceway surface of relatively small diameter, a fixed member having an internal tapered raceway surface, a carriage on the driven member in which a plurality of tapered rollers are journaled, means for shifting the carriage to disengage the contact between the rollers and the raceway surfaces and to engage the friction clutch and for shifting the carriage to disengage the clutch and to urge the rollers into engagement under pressure with the raceway surfaces, to establish respectively a connection through the clutch and through the rollers and the raceway surfaces, the driven member including a shaft, a support through which the shaft freely extends, a pulley through which the shaft extends and which is journaled on the support, said pulley and shaft being in free engagement so that the shaft takes its bearing from the pulley bearing, and means for coupling the driven shaft and pulley together.

3. In a power transmitting mechanism, a driver, a driving member having a universal type connection with the driver and having an external tapered raceway surface, a member having an internal tapered raceway surface, a driven member including a carriage, the carriage having a plurality of tapered rollers disposed in spaced circumferential arrangement and adapted to engage the tapered raceway surfaces, means applying axial pressure to cause the rollers to engage the raceway surfaces, and a single support for the carriage for taking the radial load thereof and arranged so that the carriage may oscillate thereabout incident to an off center position of the carriage caused by dimensional tolerance as the tapered rollers engage said raceway surfaces.

4. In a power transmitting mechanism, a driving shaft journalled in bearings on a substantially fixed axis, a driven shaft substantially coaxial with the driving shaft and having a single bearing support so that it can oscillate relative to the axis of the driving shaft, frictional planetary type coupling means between the driving shaft and the driven shaft comprising a fixed outer member having an internal tapered raceway, a carrier rigid with the driven shaft, a plurality of circumferentially arranged tapered rollers journalled on the carrier and arranged to engage said internal tapered raceway, a driving member projecting from the end of the driving shaft and having an exterior tapered raceway for engaging the tapered rollers, means providing a universal type of coupling between the driving shaft and the driving member, means exerting a force axially to place the raceways and the roller into frictional wedging engagement whereby the driven shaft adjusts itself to a position determined by the internal raceway and the driving member adjusts itself to a position determined by the tapered rollers to insure and maintain constant rolling contact between all the rollers and the raceway surfaces.

FRED G. WAHL.